United States Patent

[11] 3,620,453

| [72] | Inventors | Abraam Gancberg<br>31, rue Andre Baillon, Forest;<br>Raymond Carpentier, 19, avenue Blucher,<br>Waterloo; Rene Paquet, 251, rue<br>d'Horrues, Braine-le-Comte, all of Belgium |
|---|---|---|
| [21] | Appl. No. | 860,829 |
| [22] | Filed | Sept. 24, 1969 |
| [45] | Patented | Nov. 16, 1971 |
| [32] | Priority | Sept. 26, 1968 |
| [33] | | Belgium |
| [31] | | 45818/68 |

[54] SHAPED ARTICLE WITH INSECTICIDAL PROPERTIES
12 Claims, No Drawings

[52] U.S. Cl. .................................................... 239/60,
43/131, 239/6, 239/34, 424/16, 424/19, 424/21,
424/23, 424/219, 424/357
[51] Int. Cl. ....................................................... A24f 25/00,
A61l 9/04, A01m 1/20

[50] Field of Search ........................................... 424/2, 19,
21, 23, 16, 357; 43/131; 239/6, 34, 60

[56] References Cited
UNITED STATES PATENTS

| 3,056,723 | 10/1962 | Galloway .................... | 424/219 X |
| 3,168,437 | 2/1965 | Galloway .................... | 424/219 X |
| 3,278,369 | 10/1966 | Haering ...................... | 424/219 |

*Primary Examiner*—Shep K. Rose
*Attorney*—Wenderoth, Lind & Ponack

ABSTRACT: A shaped article with insecticidal properties, which comprises a solid porous mineral support, agglomerated naturally or artificially, which is impregnated with at least one insecticidal substance, the mineral support being inert with regard to the insecticidal substance under the conditions under which the article is used for combatting insects.

SHAPED ARTICLE WITH INSECTICIDAL PROPERTIES

The present invention is concerned with a shaped article possessing insecticidal properties and, more particularly, with a porous solid shaped article of a mineral nature, the pores of which are substantially filled with an insecticidal composition.

Insecticide compounds are known, particularly organo-phosphoric acid esters, such as dimethyl-2,2-dichlorovinyl phosphate (abbreviated as D.D.V.P.) which have remarkable insecticidal activity against parasitic insects such as flies, aphids, flour mites, thrips, cicadellas, acarids and the like. Some of these are, however, inconvenient to use due, for example, to having a relatively high vapor pressure at ambient temperature and consequently rapidly evaporating, which makes it necessary frequently to repeat the doses applied in order to maintain a sufficient active concentration in places where it is desired to bring about protection against parasitic insects. Another disadvantage, particularly where D.D.V.P. and other insecticide compounds of this class are concerned, is the tendency of these substances to decompose in the presence of humidity, thus losing their insecticidal activity. This tendency to decompose is found particularly in formulations in which D.D.V.P. is conventionally supported by finely divided solids, such as kaolin, diatomaceous earth, bentonite pumice, attapulgite, dolomite, limestone, gypsum and the like.

According to British Pat. Specification No. 955,350, the insecticidal organo-phosphorus compound is protected by mixing it, in the form of a composition with a polymeric organic substance having a molecular weight greater than 1,000. In this way, not only is the organo-phosphorus compound protected against humidity within the polymeric mass, because of the hydrophobic character of the latter, but, in addition, its rate of evaporation is considerably reduced. The insecticidal composition thus obtained may be shaped and may, in particular, be in the form of sheet; it may also be in the form of cellular matter (solid foams), which may or may not be ground. A disadvantage of this insecticidal composition is that exudation of the active volatile substance occurs on the surface of the product (for example a sheet), which may go so far as to form droplets which fall from the sheet, so that, besides the nonaesthetic appearance, it may soil surrounding or underlying objects. Another disadvantage is that the quantity of active substance which can be incorporated in this manner in the plastic material is relatively limited due to the fact that the amount of active substance, incorporated as a plasticizer or coplasticizer, must not exceed a certain amount with reference to the plastic material; as a rule, the percentage content of insecticidal substance in a sheet of this type is of the order of 20–25 percent by weight.

According to Belgian Pat. No. 692,754, a volatile insecticide (or other active volatile material) is adsorbed by a calcareous solid substance of animal origin and of a porous nature, for example a bone or a solid substance originating from a mollusc (cephalopode), particularly cuttle or sepia bone. A major disadvantage of this process is that the supply of the support material is difficult and unreliable and that, because of the very origin of this support, there are considerable limits to the dimensions and configurations of the shaped insecticidal articles thus manufactured. Moreover, it is not stated in this patent specification whether an active material sensitive to humidity, as is the case particularly with D.D.V.P., would or would not be protected when adsorbed by the natural calcareous solid substance, while, in addition, this patent specification does not cite any concrete example of the embodiment.

According to the present invention, the surprising and unforeseeable discovery has been made that the siliceous, aluminous, silico-aluminous, silico-calco-aluminous, silico-calcareous, calco-aluminous and calcareous mineral substances which, as has been stated above, deteriorate labile insecticidal compositions, particularly organo-phosphoric acid esters such as D.D.V.P., when said mineral substances are in the pulverulent state, on the other hand exhibit substantially inert behavior towards these insecticidal compositions when they are naturally or artificially agglomerated in the form of porous solids. It is, therefore, possible to impregnate these porous mineral solids with a volatile and labile active insecticidal substance, such as D.D.V.P., for the purpose of manufacturing shaped articles possessing insecticidal properties.

We have also found that the shaped articles thus obtained slowly release the volatile active insecticidal substance with which they are impregnated, since the insecticidal properties of shaped articles manufactured in this way are maintained for several months. The D.D.V.P. introduced into such a shaped article is perfectly preserved if stored in a hermetically sealed container Thus, by extraction of the D.D.V.P. with methylene chloride and examination of the extract by gas chromatography, it is found that all of the D.D.V.P. is recovered after a period of storage of 4 months or even longer.

The shaped insecticidal article according to the present invention is, therefore, characterized by a solid porous mineral support, agglomerated naturally or artificially, which, under the conditions of use in the combatting of insects, is inert to the active insecticidal substance with which it is impregnated.

By a naturally or artificially agglomerated solid porous mineral support, there is to be understood any natural or artificial mineral substance of a siliceous, aluminous, silico-aluminous, silico-calco-aluminous, silico-calcareous, calco-aluminous or calcareous nature obtained from mineral origin and the constituent particles of which are naturally or artificially agglomerated to form a porous solid body of any geometrical shape. Among the porous solid substances complying with this definition, mention is made, by way of example, of pumice stone sawn into sheets, an artificial porous calcium silico-aluminate agglomerate produced from lime and fly ash from thermal power stations and powdered aluminum, an autoclaved or naturally aged porous asbestos-cement agglomerate, a porous abestos-silica agglomerate constituted by the amosite or chrysotile variety of asbestos and calcium silicate and the like.

The porosity of the naturally or artificially agglomerated solid porous mineral support should be as great as possible so as to retain, by adsorption, a large amount of active insecticidal matter; for the same reasons, the dimensions of the pores will be as small as possible, in order that the capillary forces may apply a very great retaining action to the material and control more effectively the speed of evaporation of the insecticide. By way of indication, and taking as example a porous support of amosite-silica agglomerate, said support may have a porosity of 68 percent, pores of an average dimension of the order of 500 A. and specific surface area of about 32 square meters per gram.

By active insecticidal substance, there is to be understood here any volatile insecticidal substance which, under the normal conditions of use, has a vapor pressure of the order of 0.001 mm. Hg. or more at 25° C. More particularly, the active insecticidal substance belongs to the dimethyl-2,2-dichlorovinyl phosphate (D.D.V.P.) class of compounds, including other similar organo-phosphorus compounds corresponding to the general formula:

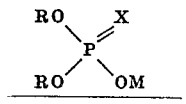

in which R is an alkyl radical; X is an oxygen or sulfur atom; M a radical having the following structure:

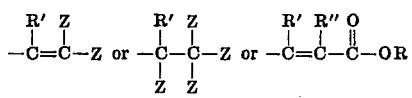

in which R' is a hydrogen atom or an alkyl radical; Z is a halogen atom and R" is a hydrogen or halogen atom or an alkyl radical.

According to another particularly advantageous feature of the present invention, for the purpose of impregnation use may be made of a mixture of active insecticidal substances and one or more chemical substances soluble at ordinary temperature or at elevated temperature in the insecticide and exerting a regulating effect on the vapor pressure of the insecticide used, and also having water-repellent properties, for example, mineral oils, such as vaseline oil, organic derivatives of chlorinated diphenyl or chlorinated polyphenyl, silicone oils and the like. The addition of these auxiliary substances to the active insecticide substance has the effect not only of providing it with additional protection against the hydrolytic effects of atmospheric water vapor but of reducing at will the speed of evaporation of said active insecticide substance. The water-repellent substance is added in an amount of from 0 to 40 percent by weight, preferably from 1 to 25 percent by weight, of the mixture of active insecticide substance and waterproofing substance.

The porous article may also be coated with a water-repellent polymer film, for example a film of high- or low-pressure polyethylene or any other polymer permeable to the vapors of the active insecticidal substance but opposing the penetration of atmospheric humidity.

In order to prepare the shaped insecticidal articles according to the present invention, use is made of any process enabling the insecticide to be introduced into the pores of the support. The latter is preferably first subjected to treatment of such a nature as to eliminate the humidity which it contains. This treatment may, for example, consist of simple heating to a temperature of from 30° to 500° C. for a period of from 24 hours to 10 seconds depending on the nature of the support, its porosity, its behavior when heated, its degree of retention of humidity and the like, This treatment may also consist of treatment in a more or less high vacuum, i.e., with a residual pressure which may be be between atmospheric pressure and 0.1 mm. Hg. Vacuum drying treatment may, if desired, be combined with hot drying.

We have also found that, in order to improve the life of the insecticide, especially of D.D.V.P., in the shaped article of the present invention, it is advantageous to acidify the porous article so that the pH thereof, measured in aqueous solution under standard conditions, is between 5 and 7, preferably between 5.5 and 6.5. This acidification is preferably carried out before impregnation of the porous article with the insecticidal composition. As acid, there may be used an aqueous solution of any inorganic or organic acid; in particular, excellent results have been obtained when using an aqueous solution of oxalic acid as the acidification agent. The quantity and concentration of the aqueous solution of acid is selected in such a manner that the pH of the acidified porous article is within the range given above. After the acidification, the shaped article is dried before carrying out the impregnation with the insecticidal composition.

The operation of impregnating the porous article, whether acidified or not, with the active insecticidal material, or with a mixture of active insecticidal material and water-repellent substance, may be effected by known methods, particularly by total or partial immersion of the support in the active insecticidal material or in the aforesaid mixture of active insecticidal material and water-repellent substance. One or more organic diluents or solvents may also be added in order to facilitate the penetration of the impregnation agent into the porous article. Another method of impregnation is to bring the dried porous support, previously treated by high vacuum, into contact with the insecticide vapor. Similarly, the porous support may be impregnated by spraying the insecticide or the aforesaid insecticidal composition on to the support or else by depositing a certain quantity of insecticide in an adequate cavity existing in the support, for example a hole shaped by moulding of drilling, from which the porous material is impregnated with insecticide or insecticidal composition.

The operations of impregnation may be carried out at temperatures between −20° and +250° C., depending on the volatility of the insecticide, the characteristics of the support and the impregnation process selected.

After impregnation, the support is drained for a few minutes in order to eliminate insecticide which has not been adsorbed and about 1 hour after draining, the impregnated porous article is dry, able to be handled and ready for use.

The shaped insecticidal article according to the invention has numerous advantages. Thus, in comparison with the shaped article according to British Pat. No. 955,350, it has the advantage that the exudation of the active volatile substance in the form of droplets is completely eliminated, with the result that it does not necessarily have to be enclosed in a case but may be used without protection. Another advantage is that the amount of active insecticidal substance may be considerably higher; in fact, instead of from 20 to 25 percent of active insecticidal material, the shaped article according to the invention may contain up to 60 percent of active material, without exudation of the latter, thus making it possible either to release a larger amount of insecticide and/or to extend considerably the duration of insecticidal activity of the shaped insecticidal article. Finally, the support material is much less expensive. The shaped article thus obtained is unbreakable, noninflammable, imputrescible and can be colored.

Compared with the product of Belgian Pat. No. 692,754, the shaped article of the present invention offers the advantage that it may use, as support material, mineral materials other than those proposed in the patent, namely materials which are not subject to the limitations as to dimensions, porosity and difficulty of supply which are inherent in the latter.

The following examples are given for the purpose of illustrating the present invention;

EXAMPLE 1

A natural block of pumice stone, which has been sawn to the following dimensions: 12.3×2×2 cm., i.e., with a total surface area of about 106 square cm., is used for the tests. The percentage of porosity found is 35 percent, the mean dimensions of the pores is 740 A. and the calculated specific surface is 1 square meter per gram. The block is dried at 100° C. for 5 hours, cooled in a desiccator to ambient temperature, weighed (weight found: 57 grams) and immersed for 25 minutes in D.D.V.P. After draining, the block is weighed (amount of D.D.V.P. absorbed: 24.3 grams, that is to say the impregnated sheet contains 29.8 percent by weight of D.D.V.P.

The impregnated block is then suspended in a room exposed to variations of relative humidity of the air (60 to 75 percent relative humidity) and of temperature (20° to 25° C.) in order to simulate the real conditions of practical use, and the block is weighed every seven days in order to determine the loss of D.D.V.P. by evaporation.

| | |
|---|---|
| Loss of D.D.V.P. after 7 days | 1.76 grams |
| from the 8th to the 14th day | 1.08 grams |
| from the 15th to the 21st day | 1.83 grams |
| from the 22nd to the 28th day | 1.74 grams |

EXAMPLE 2

The method of operation is the same as in example 1, except that the pumice stone is replaced by a sheet of calcium silicoaluminate (fly ash agglomerated with lime and with powdered aluminum) of 15×2.8×1.4 cm., with a weight of 48.6 grams.

| | |
|---|---|
| Percentage of porosity of sheet | 55% |
| Mean dimension of pores | 235 A. |
| Specific surface | 24 square meters per gram |
| Weight of D.D.V.P. absorbed | 23.3 grams, i.e., the impregnated sheet contains 32.4 percent by weight of D.D.V.P. |

Results of the determination of the loss of weight of D.D.V.P. by evaporation:

| | |
|---|---|
| Loss of D.D.V.P. after 7 days | 2.3 g. |

| from 8th to 14th day | 1.32 g. |
| from 15th to 21st day | 1.58 g. |
| from 22nd to 28th day | 1.36 g. |

EXAMPLE 3

The method of operation is the same as in example 1, except that the pumice stone is replaced by a sheet of amosite-silica (containing 35 percent by weight of amosite and 65 percent of calcium silicate) of 15×3×1.2 cm., i.e., about 133 square cm. of surface and a weight of 36.42 g.

| Percentage of porosity of sheet | 68% |
| Mean dimension of pores | ±500 A. |
| Specific surface | 32 square meters per gram |
| Weight of D.D.V.P. absorbed | 28.99 g., i.e., the impregnated sheet contains 44.3 percent by weight of D.D.V.P. |

Results of determination of loss of weight of D.D.V.P. by evaporation:

| Loss of D.D.V.P. after 7 days | 1.47 g. |
| from 8th to 14th day | 1.21 g. |
| from 15th to 21st day | 0.7 g. |
| from 22nd to 28th day | 0.7 g. |

EXAMPLE 4

For the following tests, use is made of sheets of amosite-silica of the type used in example 3. The conditions of operation are those indicated in example 1.

In example 4a a mixture of D.D.V.P. and chlorinated diphenyl (7:1 by weight is used.

In example 4b a mixture of D.D.V.P. and chlorinated polyphenyl (7:1 by weight) is used.

In example 4c, a mixture of D.D.V.P. and vaseline oil (7:1 by weight) in used.

In example 4d, after absorption and draining of the sheet impregnated with D.D.V.P., it is soaked in a solution of 20 g. of low-pressure polyethylene in 80 g. n-heptane and the sheet is then dried.

The results of the determination of the weight loss of D.D.V.P. by evaporation are as follows:

EXAMPLE 4a

| Weight of sheet | 37.7 g. |
| weight of D.D.V.P. absorbed | 26.62 g. (the sheet contains 39.7 percent of absorbed D.D.V.P.) |
| Weight of chlorinated diphenyl absorbed: | 3.82 g. (the sheet contains 5.6 percent of absorbed diphenyl) |
| Loss of D.D.V.P. after 7 days: | 1.1 g. |
| from 8th to 14th day | 1.0 g. |
| from 15th to 21st day | 0.9 g. |
| from 22nd to 28th day | 1.0 g. |

EXAMPLE 4b

| Weight of sheet | 39.22 g. |
| Weight of D.D.V.P. absorbed | 24.96 g. (the sheet contains 36.7 percent of absorbed D.D.V.P.) |
| Weight of chlorinated polyphenyl absorbed | 3.57 g. (the sheet contains 5.27 percent of absorbed chlorinated polyphenyl) |
| Loss of D.D.V.P. after 7 days | 1.0 g. |
| from 8th to 14th day | 1.0 g. |
| form 15th to 21st day | 0.8 g. |
| from 22nd to 28th day | 0.7 g. |

EXAMPLE 4c

| Weight of sheet | 38.4 g. |
| Weight of D.D.V.P. absorbed | 27.1 g. (the sheet contains 39.1 percent of absorbed D.D.V.P.) |
| Weight of Vaseline oil absorbed | 3.86 g. (the sheet contains 5.6 percent of absorbed oil) |
| Loss of D.D.V.P. after 7 days | 1.04 g. |
| from 8th to 14th day | 0.9 g. |
| from 15th to 21st day | 0.9 g. |
| from 22nd to 28th day | 0.8g. |

EXAMPLE 4d

| Weight of sheet | 37 g. |
| Weight of D.D.V.P. absorbed | 26.1 g. (the sheet contains 41.3 percent of absorbed D.D.V.P.) |
| Loss of D.D.V.P. after 7 days | 0.75 g. |
| from 8th to 14th day | 0.9 g. |
| from 15th to 21st day 0.9 g. | |
| from 22nd to 28th day | 0.7 g. |

Comparison with examples 1 to 3, shows that the addition of water-repellent substances to the D.D.V.P. (examples 4a to 4c) or the application of a water-repellent substance in the form of an outer layer (example 4d) has the effect of regularizing and reducing the loss of D.D.V.P. by evaporation in relation to time.

EXAMPLE 5

For the following tests, use is made of sheets of amosite-silica of the type used in example 3 but with dimensions of 20×3.5×0.65 cm.

In example 5a, a sheet of amosite-silica is dried for 5 hours at 110°–120° C., left to cool to ambient temperature in a desiccator, weighed 29.9 g.) and impregnated with D.D.V.P. as in the preceding examples.

Weight of impregnated sheet: 55.9 g.
Weight of D.D.V.P. absorbed: 26 g.

In example 5b, a sheet is first treated with 100 g. of a 5 percent aqueous solution of oxalic acid for 24 hours at ambient temperature. The acidified sheet obtained (pH 5.75) is drained off and dried completely at 110°–120° C. After cooling, it is weighed (34.4 g.) and then impregnated with D.D.V.P. as in example 5a.

Weight of impregnated sheet: 60.4 g.
Weight of D.D.V.P. absorbed: 26 g.

In example 5c, there is used the procedure described in example 5a except that the sheet is impregnated with a mixture of 26 g. D.D.V.P. and 12 g. tetrachlorodiphenyl.

Weight of impregnated sheet: 66.05 g.
Weight of D.D.V.P. absorbed: 25.5 g.
Weight of tetrachlorodiphenyl absorbed: 11.7 g.

In example 5d, there is used a sheet acidified as in example 5b which is impregnated with a mixture of 26 g. D.D.V.P. and 6 g. tetrachlorodiphenyl. The impregnated sheet has a weight of 70.5 g.

In example 5e, there is used exactly the same procedure as in example 5d, except that the amount of tetrachlorodiphenyl used is increased from 6 g. to 12 g.

There is subsequently determined the loss of weight of the sheets of examples 5a–5e, as a function of time, over the course of 12 weeks following the preparation thereof at an average relative humidity of 30–40 percent and at an average temperature of 18°–25° C.

The results obtained are set out in the following table:

TABLE

| Period (in weeks) | Loss of Weight (in g.) | | | | |
| --- | --- | --- | --- | --- | --- |
| | Ex. 5a | Ex. 5b | Ex. 5c | Ex. 5d | Ex. 5e |
| 1 | 3 | 4.3 | 2.2 | 2.9 | 2.8 |
| 2 | 2.7 | 2.9 | 1.9 | 2.7 | 2.2 |

| | | | | |
|---|---|---|---|---|
| 3 | 1.9 | 1.7 | 1.9 | 2.2 | 1.65 |
| 4 | 0.9 | 1.25 | 1.4 | 1.3 | 1.28 |
| 5 | 0.42 | 0.7 | 0.75 | 0.9 | 0.97 |
| 6 | 0.71 | 0.51 | 0.75 | 0.6 | 0.74 |
| 7 | 0.4 | 0.3 | 0.5 | 0.45 | 0.55 |
| 8 | 0.24 | 0.3 | 0.2 | 0.3 | 0.5 |
| 9 | 0.4 | 0.55 | 0.26 | 0.29 | 0.4 |
| 10 | 0.1 | 0.2 | 0.1 | 0.16 | 0.25 |
| 11 | 0 | 0.15 | 0 | 0.25 | 0.3 |
| 12 | 0 | 0.2 | 0 | 0.1 | 0.25 | comparison of examples 5a and 5b shows the favorable effect of acidification of the sheet (example 5b) on the persistance of the D.D.V.P.; however, the release of D.D.V.P. in the first week is very large.

A comparison of examples 5a and 5c shows that the tetrachlorodiphenyl controls the release of D.D.V.P.; however, in both cases, the release of D.D.V.P. is nil commencing with the 11th week.

A comparison of example 5d with examples 5a and 5c shows that the association of an acidified sheet with a mixture of D.D.V.P. and tetrachlorophenyl ameliorates the regularity of release of D.D.V.P. as well as its persistance.

From example 5e, where there is used twice as much tetrachlorodiphenyl as in example 5d, it can be seen that the results obtained are even more favorable.

EXAMPLE 6

THis example is given to shown the favorable influence of an addition of a methyl phenyl silicone oil on the protection of D.D.V.P. in the sheets against atmospheric humidity. The sheets used are of the amosite-silica type, acidified by impregnation with 9 percent by weight solution of oxalic acid in the manner described in example 5b. Sheets 6a and 6b subjected to the tests are both impregnated with a mixture of D.D.V.P./tetrachlorodiphenyl in a weight ratio of 68.4/31.6. Furthermore, sheet 6a is additionally impregnated with 1 percent by weight of methyl phenyl silicone oil at the same time as it is impregnated with the insecticidal mixture, whereas sheet 6b does not receive this addition. The variation in losss of weight of sheets 6a and 6b is observed over the course of the first 14 days after preparation thereof. The results obtained are set out in the following table. During the tests, the temperature varied between 20° and 25° C. and the relative humidity between 70 and 80 percent.

TABLE

| Period (in days) | loss of weight (g.) | |
|---|---|---|
| | Ex. 6a. | Ex. 6b. |
| 1 | 0 | +0.3 |
| 2 | 0.1 | +0.05 |
| 3 | 0.15 | 0 |
| 4 | 0.1 | 0.02 |
| 5 | 0.2 | 0.18 |
| 6 | 0.26 | 0.25 |
| 7 | 0.27 | 0.22 |
| 8 | 0.32 | 0.18 |
| 9 | 0.25 | 0.15 |
| 10 | 0.23 | 0.21 |
| 11 | 0.25 | 0.36 |
| 12 | 0.19 | 0.14 |
| 13 | 0.08 | +0.03 |
| 14 | 0 | +0.09 |

From an examination of the above table, it can be seen that the sheet of example 6b, which does not contain the silicone oil, gains weight in the 1st, 2nd, 13th and 14th days, instead of losing weight, this gain signifying that the sheet has absorbed atmospheric humidity which has a prejudicial effect on the preservation of the D.D.V.P. On the contrary, in the case of example 6a, which contains 1 percent silicone oil, there is no increase in weight under the same experimental conditions, which shows that the silicone oil behaves in an efficient manner as a barrier against the take up of atmospheric water by the sheet

EXAMPLE 7

This example shows the efficiency of the shaped articles according to the present invention in a "knack down" test carried out on 4 days old adult flies (*Musca domestica* var. JEM $F_1$). In this test, there is used a sheet of the type described in example 5e in a room with a volume of 30 $m^3$. The tests for insecticidal activity were carried out over a period of 90 days, as indicated in the following table, during which every hour for a period of 8 hours, the percentage knock down was determined, the content of D.D.V.P. in the surrounding atmosphere being reduced to nil at the beginning of each test. During the course of these tests, the temperature in the room varied between 20° and 24° C. and the relative humidity varied between 50 and 70 percent.

By "knock down" there is to be understood that the insect falls to the ground due to the action of the insecticide, remains there alive for several minutes but is incapable of normal movement. The knock down power is 100 percent when, of 100 flies, all are affected and is 0 percent when no flies are affected. The results obtained are given in the following table:

TABLE
["Knock-down" power (percent)]

| Hours | 1 | 2 | 3 | 4 | 5 | 6 | 7 | 8 |
|---|---|---|---|---|---|---|---|---|
| Observations after (days): | | | | | | | | |
| 1 | 100 | 100 | 100 | 100 | 100 | 100 | 100 | 100 |
| 7 | 92 | 100 | 100 | 100 | 100 | 100 | 100 | 100 |
| 15 | 45 | 95 | 100 | 100 | 100 | 100 | 100 | 100 |
| 28 | 0 | 34 | 87 | 98 | 99 | 99 | 99 | 99 |
| 48 | 0 | 9 | 40 | 61 | 79 | 91 | 100 | 100 |
| 60 | 0 | 1 | 26 | 43 | 62 | 73 | 81 | 84 |
| 74 | 0 | 0 | 0 | 0 | 1 | 4 | 21 | 24 |
| 90 | 0 | 0 | 0 | 0 | 0 | 1 | 6 | 17 |

We claim:

1. A shaped article with slow-releasing insecticidal D.D.V.P.-vapor properties, which consists essentially of a solid block or sheet of acidified porous mineral support, agglomerated naturally or artificially, which is impregnated by substantially filling the pores with DDVP as an insecticidal substance, said solid block or sheet of porous mineral support being inert with regard to said insecticidal substance under the humid conditions of usage which decompose said insecticide in finely divided forms of said mineral, said porous mineral support being a member selected from the group consisting of (a) siliceous, aluminous, silico-aluminous, silico-calco-aluminous, silico-calcareous, calco-aluminus or calcareous matter of mineral origin; (b) pumice stone cut into sheets, (c) an artificial porous calcium silico-aluminate agglomerate made from lime and fly ash from thermal power stations and powdered aluminum; (d) an autoclaved or naturally aged porous asbestos-cement agglomerate; and (e) a porous asbestos-silica agglomerate; constituted by the amosite or chrysolite variety of asbestos and calcium silicate.

2. A shaped article according to claim 1, wherein the porous mineral support is selected from the group consisting of siliceous, aluminous, silico-aluminous silico-calco-aluminous, silico-calcareous, calcoaluminous and calcareous matter of mineral origin.

3. A shaped article according to claim 1, wherein the porous mineral support is pumice stone cut into sheets.

4. A shaped article according to claim 1, wherein the porous mineral support is an artificial porous calcium silico-aluminate agglomerate made form lime and fly ash from thermal power stations and powdered aluminum.

5. A shaped article according to claim 1, wherein the mineral support is an autoclaved or naturally aged porous asbestos-cement agglomerate.

6. A shaped article according to claim 1, wherein the mineral support is a porous asbestos-silica agglomerate constituted by the amosite or chrysolite variety of asbestos and calcium silicate.

7. A shaped article according to claim 1, wherein there is additionally present a water-repellent substance which acts as a regulator of the vapor pressure of the insecticide 8. A shaped article according to claim 1, wherein there is present a water-repellent substance selected from the group consisting of mineral oil, a chlorinated diphenyl, a chlorinated polyphenyl or a silicone oil.

9. A shaped article according to claim 1 wherein the porous mineral support is covered with a water-repellent film of polyethylene.

10. A shaped article according to claim 1, wherein the porous mineral support has a pH of 5–7 as measured in water.

11. A shaped article according to claim 1, wherein the porous mineral support has a pH of 5.5–6.5 as measured in water.

12. A shaped articles as in claim 1 wherein the porous support has been acidified with oxalic acid as the acidifying agent.

UNITED STATES PATENT OFFICE
CERTIFICATE OF CORRECTION

Patent No. 3,620,453          Dated November 16, 1971

Inventor(s) Abraam GANCBERG, Raymond CARPENTIER and Rene PAQUET

It is certified that error appears in the above-identified patent and that said Letters Patent are hereby corrected as shown below:

Page one, first column, line 10 after "[33]", change "Belgium" to -- Great Britain --.

Signed and sealed this 19th day of September 1972.

(SEAL)
Attest:

EDWARD M. FLETCHER, JR.
Attesting Officer

ROBERT GOTTSCHALK
Commissioner of Patents